US010249106B2

(12) United States Patent
Pandey et al.

(10) Patent No.: US 10,249,106 B2
(45) Date of Patent: Apr. 2, 2019

(54) METHOD AND SYSTEM FOR PERFORMING VEHICLE INSPECTION

(71) Applicant: Wipro Limited, Bangalore (IN)

(72) Inventors: Nitin Pandey, Lucknow (IN); Vivek Ratan, Bokaro Steel (IN); Saloni Baweja, Meerut (IN)

(73) Assignee: Wipro Limited, Bangalore (IN)

( * ) Notice: Subject to any disclaimer, the term of this patent is extended or adjusted under 35 U.S.C. 154(b) by 71 days.

(21) Appl. No.: 14/812,102

(22) Filed: Jul. 29, 2015

(65) Prior Publication Data

US 2016/0253851 A1 Sep. 1, 2016

(30) Foreign Application Priority Data

Feb. 27, 2015 (IN) ............................ 968/CHE/2015

(51) Int. Cl.
*G07C 5/08* (2006.01)
*G01M 17/007* (2006.01)

(52) U.S. Cl.
CPC ......... *G07C 5/0808* (2013.01); *G01M 17/007* (2013.01)

(58) Field of Classification Search
None
See application file for complete search history.

(56) References Cited

U.S. PATENT DOCUMENTS

| | | | |
|---|---|---|---|
| 6,397,131 | B1 | 5/2002 | Busch et al. |
| 6,587,768 | B2 | 7/2003 | Chene et al. |
| 2007/0022410 | A1 | 1/2007 | Ban et al. |

OTHER PUBLICATIONS

Villacourt, Mario et al., Failure Reporting, Analysis, and Corrective Action System, Feb. 1, 2001, SEMATECH, pp. 3-8, 18-24 and 27-32.*

* cited by examiner

*Primary Examiner* — John Olszewski
*Assistant Examiner* — Gerrad A Foster
(74) *Attorney, Agent, or Firm* — LeClairRyan PLLC

(57) ABSTRACT

The present disclosure relates to a method and system for performing vehicle inspection. In an embodiment, the system receives inspection data of one or more parts of vehicle from inspection database and field data of the one or more parts of the vehicle from the field database. The inspection database is at manufacturing unit of the vehicle and the field database is at service unit of the vehicle. The inspection data and the field data are associated to form a joined data. A user may select one of one or more parts of the vehicle from the joined database. The system identifies relevant terms for the selected part of the vehicle and also identifies the frequency of the selected part in the inspection data and the field data. If the frequency exceeds a threshold frequency, then the system detects the probability of failure of the vehicle.

18 Claims, 4 Drawing Sheets

METHOD AND SYSTEM FOR PERFORMING VEHICLE INSPECTION

This application claims the benefit of Indian Patent Application Serial No. 968/CHE/2015 filed Feb. 27, 2015, which is hereby incorporated by reference in its entirety.

FIELD

The present subject matter is related, in general to vehicle inspection and more particularly, but not exclusively to a method and a system for performing vehicle inspection to identify probability of failure of the vehicle.

BACKGROUND

In automobile manufacturing industry, an inspection engineer in the manufacturing plant needs to perform inspection of all parts of a vehicle. The inspection engineer also has to provide special attention to a set of parts of the vehicle (having failure history) which requires detailed inspection, before the final delivery of the vehicle from the plant. The data pertaining to inspection of vehicles, gathered by the inspection engineer in the manufacturing plant, may be referred to as inspection data.

At present the inspection engineer identifies the defects of one or more parts of the vehicle and the information of the defects are stored in an inspection database at the manufacturing plant. The vehicle inspection is performed by looking at the inspection database. If some of the defects identified by the inspection engineer are major, the defects are corrected before the delivery of the vehicle.

But the problem with the existing vehicle inspection method is that, only the inspection data is considered to detect probable failure of the vehicle. The inspection data alone is not able to provide insights for probable failure of the vehicle and probable warranty defects due to which the inspection process at the manufacturing plant cannot be modified for reducing the major defects in the vehicle.

SUMMARY

In one embodiment, a method for performing vehicle inspection is disclosed. The method comprises receiving inspection data of one or more parts of a vehicle from an inspection database and field data of the one or more parts of the vehicle from a field failure database. The method further comprises associating the inspection data and the field data, based on an identification number of the vehicle, to obtain a joined data. The method further comprises identifying presence of relevant terms from the inspection data and the field data for selected one of the one or more parts of the vehicle from the joined data. The method further comprises determining frequency of the relevant terms for the selected one of the one or more parts of the vehicle. The method further comprises detecting the probability of failure of the vehicle is detected if the frequency exceeds a predefined threshold frequency.

In another embodiment, a system for performing vehicle inspection is disclosed. The system comprises a processor and a memory communicatively coupled to the processor, wherein the memory stores processor-executable instructions, which, on execution, cause the processor to receive inspection data of one or more parts of a vehicle from an inspection database and field data of the one or more parts of the vehicle from a field failure database. The processor is further configured to associate the inspection data and the field data, based on an identification number of the vehicle, to obtain a joined data. The processor is further configured to identify presence of relevant terms from the inspection data and the field data for selected one of the one or more parts of the vehicle from the joined data. Upon identifying the presence of relevant terms, the processor determines frequency of the relevant terms for the selected one of the one or more parts of the vehicle. The processor is furthermore configured to identify probability of failure of the vehicle upon detecting the frequency exceeding a predefined threshold frequency.

In another embodiment, a non-transitory computer readable medium is disclosed. The non-transitory computer readable medium comprises instructions stored thereon that when processed by at least one processor cause a vehicle inspection system to perform the act of receiving inspection data of one or more parts of a vehicle from an inspection database and field data of the one or more parts of the vehicle from a field failure database. Further, the instructions cause the processor to associate the inspection data and the field data, based on an identification number of the vehicle, to obtain a joined data. The instructions further cause the processor to identify the presence of relevant terms from the inspection data and the field data for selected one of the one or more parts of the vehicle from the joined data. The instructions furthermore cause the processor to determine the frequency of the relevant terms for the selected one of the one or more parts of the vehicle and identify probability of failure of the vehicle upon detecting the frequency exceeding a predefined threshold frequency.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
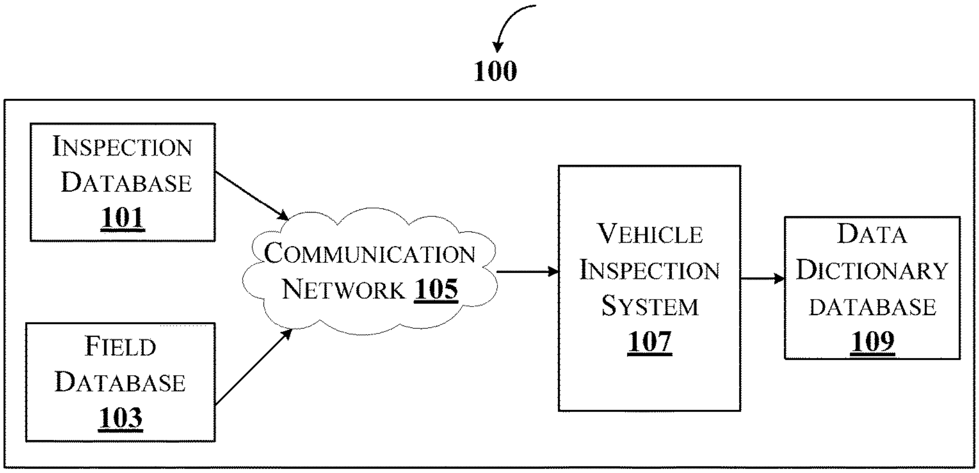
FIG. 1 shows a block diagram illustrating an exemplary environment for performing vehicle inspection in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word “exemplary” is used herein to mean “serving as an example, instance, or illustration.” Any embodiment or implementation of the present subject matter described herein as “exemplary” is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms “comprises”, “comprising”, or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by “comprises . . . a” does not, without more constraints, preclude the existence of other elements or additional elements in the system or method.

The present disclosure relates to a method and system for performing vehicle inspection. The method comprises receiving inspection data of one or more parts of a vehicle from an inspection database and field data of the one or more parts of the vehicle from a field data. Upon receiving the inspection data and the field data, the method associates the inspection data and the field data to obtain a joined data. A user may select one of one or more parts of the vehicle from the joined data. The relevant terms for the selected one of one or more parts of the vehicle are identified in both the inspection data and the field data. If the frequency of the relevant terms for the selected part exceeds a threshold frequency, then there is a probability of failure of the vehicle. The present disclosure considers both the filed data and the inspection data for identifying the probability of failure of the vehicle.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a block diagram illustrating an exemplary environment 100 for performing vehicle inspection in accordance with some embodiments of the present disclosure.

As shown in FIG. 1, the environment 100 comprises a vehicle inspection system 107 for performing inspection of vehicles. The environment 100 also comprises an inspection database 101, a field database 103 and a data dictionary database 109. The data dictionary database 109 is connected to the vehicle inspection system 107. As shown in FIG. 1, the inspection database 101 and the field database 103 are communicatively connected to the vehicle inspection system 107 through a communication network 105 for facilitating the vehicle inspection system 107 to access data/information. In an embodiment, the inspection database 101 is located at manufacturing unit of a vehicle. The inspection database 101 comprises inspection data which includes, but not limited to, vehicle identification number, name of one or more parts of the vehicle having failure comments, production date of the vehicle, warranty period of the vehicle and one or more failure comments. The failure comments are provided by an inspection engineer at the manufacturing unit of the vehicle. The inspection engineer monitors working of each part of the vehicle and provides one or more failure comments if there exists problem with the one or more parts of the vehicle. In an embodiment, the field database 103 is located at service unit of the vehicle. The field database 103 comprises field data which includes, but not limited to, vehicle identification number, name of one or more parts of the vehicle having failure comments, one or more failure comments and warranty period of the one or more parts of the vehicle. The failure comments may be provided by a service person at the field unit. In an embodiment, the data dictionary database stores names of each part of the vehicle and one or more common terms/equivalent terms which are similar to the names of each part of the vehicle.

Figure 2:
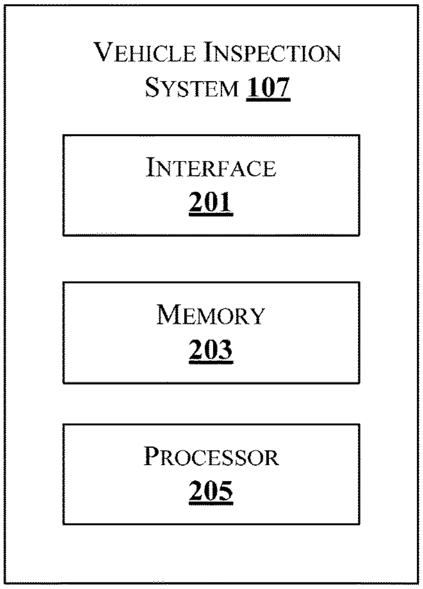
FIG. 2 shows a block diagram illustrating a vehicle inspection system in accordance with some embodiments of the present disclosure.

FIG. 2 shows a block diagram illustrating a vehicle inspection system 107 in accordance with some embodiments of the present disclosure.

The vehicle inspection system 107 comprises an interface 201, a memory 203 and a processor 205. The interface 201 and the memory 203 are communicatively coupled to the processor 205. The memory 203 stores processor-executable instructions which on execution cause the processor 205 to perform one or more steps. In an embodiment, the vehicle inspection system 107 receives inspection data of one or more parts of the vehicle from the inspection database 101 and the field data of the one or more parts of the vehicle from the field database 103. The vehicle inspection system 107 stores the inspection data and the field data in the memory 203. The processor 205 associates the inspection data and the field data to form a joined data. The joined data includes information which include, but not limited to, vehicle identification number, production date of the vehicle, warranty period of the vehicle, names of one or more parts of the vehicle which are listed in the field database 103, names of one or more parts of the vehicle which are listed in the inspection database 101, one or more failure comments listed in the inspection database 101 and the one or more failure comments listed in the field database 103. A user may select any part of the vehicle from the joined database. The processor 205 identifies one or more relevant terms for the selected part of the vehicle from the inspection database 101 and the field database 103. The relevant terms are the common/equivalent terms for the selected part of the vehicle. Upon identifying the relevant terms, the processor 205 identifies frequency of the relevant terms in the joined database i.e number of times the selected part has appeared in the joined database. If the frequency exceeds a predefined threshold frequency then the processor 205 detects the probability of failure of the vehicle. If the frequency is less than the threshold frequency, then the processor 205 detects that there is no failure in the vehicle. If there are any new terms in the identified relevant terms, they are updated in the data dictionary database 109.

Figure 3:
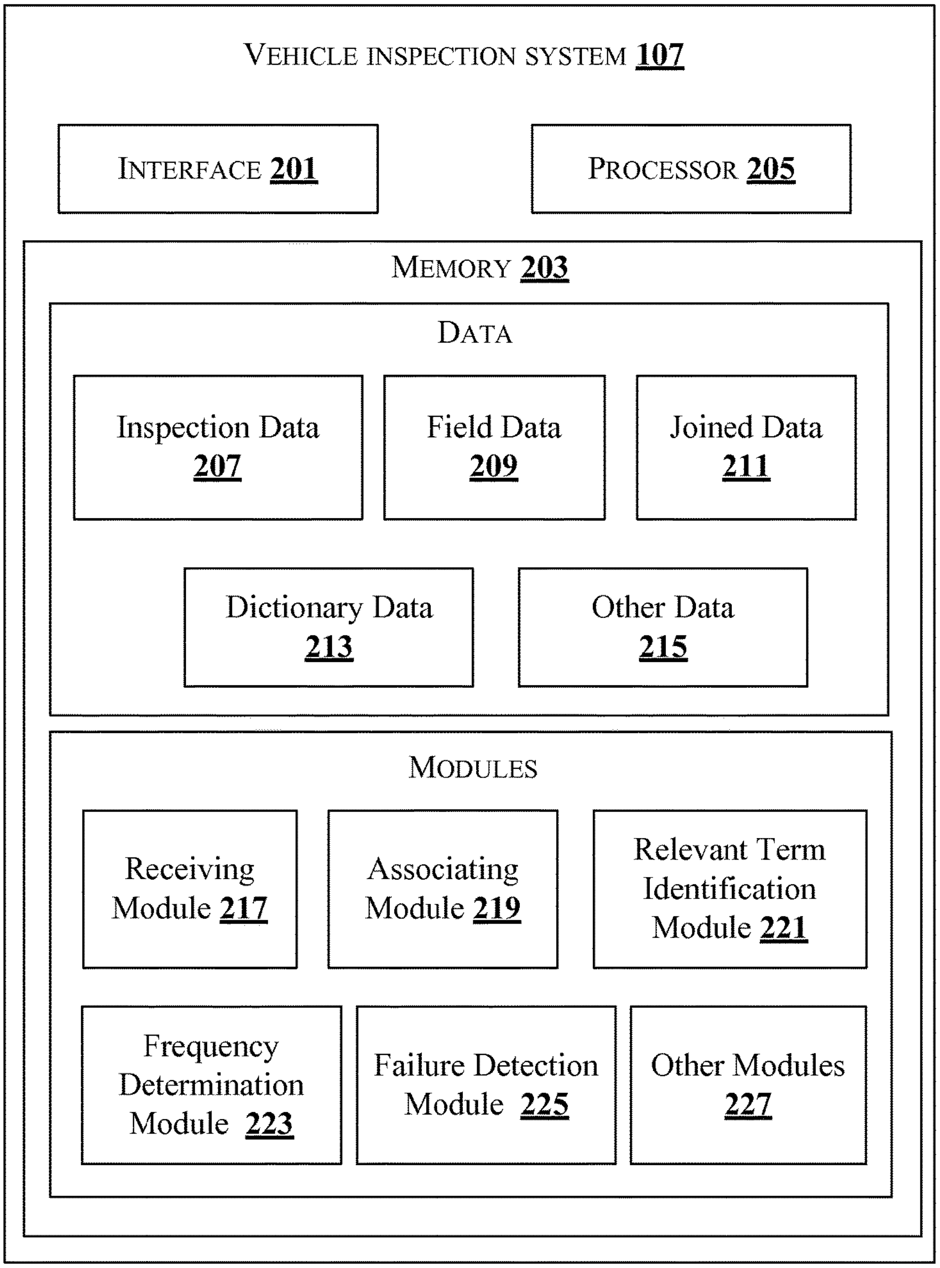
FIG. 3 shows a detailed block diagram illustrating a vehicle inspection system in accordance with some embodiments of the present disclosure.

FIG. 3 shows a detailed block diagram illustrating a vehicle inspection system 107 in accordance with some embodiments of the present disclosure.

In one implementation, the vehicle inspection system 107 receives data from inspection database 101 and field database 103. As an example, the data is stored within the memory 101. In an embodiment, the data includes inspection data 207, field data 209, joined data 211, dictionary data 213 and other data 215. In the illustrated FIG. 3, one or more modules stored in the memory 203 are described herein in detail.

In one embodiment, the data may be stored in the memory 203 in the form of various data structures. Additionally, the aforementioned data can be organized using data models, such as relational or hierarchical data models. The other data 215 may store data, including temporary data and temporary files, generated by modules for performing the various functions of the vehicle inspection system 107.

In an embodiment, the inspection data 207 is received from the inspection database 101. The inspection database 101 is located at manufacturing unit of the vehicle. The inspection engineer monitors the functioning of the vehicle. At this point, the inspection engineer may detect failure of one or more parts of the vehicle. Accordingly, the inspection engineer provides information regarding the failure of the one or more parts of the vehicle and the information is stored in the inspection database 101. The inspection database 101 comprises information which includes, but not limited to, vehicle identification number, names of one or more parts of the vehicle identified as failure parts by the inspection engineer, warranty period of the vehicle and one or more comments provided by the inspection engineer for the failure parts of the vehicle. The below table 1 illustrates exemplary inspection data 207 stored in the inspection database 101.

TABLE 1

INSPECTION DATA

| Vehicle Identification Number | Production Date | Warranty Period | Inspection Part | Inspection Failure Comments |
|---|---|---|---|---|
| 2130 | 01-11-2012 | 01-02-2013 | Torque data | Air bag light On |
| 2163 | 01-11-2012 | 01-02-2013 | Torque data | Air bag light On |
| 5349 | 02-11-2012 | 02-02-2013 | torque data | Air bag light On |
| 3248 | 10-11-2012 | 10-02-2013 | torque data | Air bag light On |
| 3567 | 15-11-2012 | 15-02-2013 | Function test | Seat Kit problem |

As an example, the above table 1 shows information of 5 vehicles with vehicle identification numbers 2130, 2163, 5349, 3248 and 3567 which are manufactured in November 2012. The inspection engineer detects problem in air bag in the vehicles with vehicle identification numbers 2130, 2163, 5349, 3248 and the problem in seat kit in the vehicle with the vehicle identification number 3567. The inspection engineer may provide the inspection part name for which the air bag problem has been identified as "torque data". The inspection engineer may provide the inspection part name for which seat kit problem has been identified as "function test". The inspection database 101 also includes one or more failure comments by the inspection engineer for the failure part of the vehicle.

In an embodiment, the field data 209 is received from the field database 103. The field database 103 is stored at service unit of the vehicle. As an example, the vehicle may encounter a problem while usage during manufacture warranty period and hence requires servicing. Therefore, the vehicle is brought to the service/field unit. The service person may indicate the information of the problem encountered in the field database 103. The field database 103 also stores information of the vehicle identification number, warranty period of one or more parts of the vehicle in which the problem is detected, names of one or more parts of the vehicle and one or more failure comments provided by the service person. The below table 2 illustrates an exemplary field data 209 stored in the field database 103.

TABLE 2

FIELD DATA

| Vehicle Identification Number | Production Date | Warranty Period | Vehicle Part | Field Failure Comments | Field part |
|---|---|---|---|---|---|
| 2130 | 01-11-2012 | 01-02-2013 | Occupant detection sensor | User states that Air bag light On | Airbag |
| 2163 | 01-11-2012 | 01-02-2013 | Occupant detection sensor | User states that Air bag light On | Pressure Sensor |
| 5349 | 02-11-2012 | 02-02-2013 | Occupant detection sensor | User states that Air bag light On | Airbag Sensor |
| 3248 | 10-11-2012 | 10-02-2013 | Occupant detection sensor | User states that Air bag light On | Air bag light |
| 3567 | 15-11-2012 | 15-02-2013 | Seat Kit | User states problem in seat Kit problem | Seat kit |

As an example, the above table shows information of 5 vehicles with vehicle identification numbers 2130, 2163, 5349, 3248 and 3567 which are manufactured in November 2012. These five vehicles have been bought to the service unit upon identifying failure in one or more parts of the vehicle during warranty period by the user. The field database 103 is maintained at the service unit of the vehicle. The users of the vehicles 2130, 2163, 5349, 3248 have encountered the problem in air bag of the vehicle. The service person may indicate the part name as "Airbag" for which the air bag problem has been identified for vehicle with vehicle identification number 2130. Similarly, the service person may indicate the part name as "pressure sensor" for the vehicle with the vehicle identification number 2163. The vehicle part for airbag problem is provided as occupant detection sensor and the vehicle part for the seat kit problem is provided as seat kit in the field database 103. The field database 103 also includes one or more failure comments by the inspection engineer for the failure part of the vehicle.

In an embodiment, the joined data 211 is formed by associating the inspection data 207 and the field data 209 based on the vehicle identification number of each vehicle i.e based on the identification number of the vehicle, the corresponding information of the vehicle is obtained from the inspection database 101 and the field database 103. The exemplary joined data 211 is illustrated in the below table 3. In an embodiment, the joined data 211 is formed by using an association algorithm.

TABLE 3

JOINED DATA

| Vehicle Identification Number | Production Date | Warranty Period | Inspection Part | Vehicle Part | Field part | Inspection Failure Comments | Field Failure Comments |
|---|---|---|---|---|---|---|---|
| 2130 | 1 Nov. 2012 | 1 Feb. 2013 | Torque data | Occupant detection sensor | Airbag | Air bag light On | User states that Air bag light On |
| 2163 | 1 Nov. 2012 | 1 Feb. 2013 | Torque data | Occupant detection sensor | Pressure Sensor | Air bag light On | User states that Air bag light On |
| 5349 | 2 Nov. 2012 | 2 Feb. 2013 | Torque data | Occupant detection sensor | Airbag Sensor | Air bag light On | User states that Air bag light On |
| 3248 | 10 Nov. 2012 | 10 Feb. 2013 | Torque data | Occupant detection sensor | Air bag light | Air bag light On | User states that Air bag light On |
| 3567 | 15 Nov. 2012 | 15 Feb. 2013 | Function Test | Seat Kit | Seat kit | Seat Kit problem | User states problem in seat kit |

In an embodiment, the dictionary data 213 comprises information of one or more relevant terms for the one or more parts of the vehicle.

In an embodiment, the data stored in the memory 203 are processed by the modules of the vehicle inspection system 107. The modules may be stored within the memory 203 as shown in FIG. 3. In an example, the modules, communicatively coupled to the processor 205, may also be present outside the memory 203. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the modules may include, for example, a receiving module 217, an associating module 219, a relevant term identification module 221, a frequency determination module 223, a failure detection module 225 and other modules 227. The other modules 227 may be used to perform various miscellaneous functionalities of the vehicle inspection system 107. It will be appreciated that such aforementioned modules may be represented as a single module or a combination of different modules.

In an embodiment, the receiving module 217 is configured to receive inspection data 207 from the inspection database 101 and field data 209 from the field database 103. The inspection data 207 includes information of one or more parts of the vehicle which are identified as failure parts by an inspection engineer at the manufacturing unit of the vehicle. The field data 209 includes information of the one or more parts of the vehicle which are identified as failure parts by the user of the vehicle.

In an embodiment, the associating module 219 is configured to associate the inspection data 207 and the field data 209 to form the joined data 211. The associating module 219 includes an association algorithm for associating the inspection data 207 and the field data 209. The associating module 219 associates the inspection data 207 and the field data 209 based on identification number of the vehicle i.e is for each vehicle identification number, the corresponding inspection data 207 and the field data 209 is associated. In one example, the association module 219 may associate the inspection data 207 and the field data 209 based on an apriori algorithm.

In an embodiment, the relevant term identification module 221 is configured to identify the relevant terms for the selected part of the vehicle. As an example, the user may select a part of the vehicle from the joined data 211. For the selected vehicle part, the relevant term identification module 221 identifies one or more relevant terms i.e one or more equivalent words from the inspection database 101 and the field database 103. For example, the selected part of the vehicle may be "occupant detection sensor". The "occupant detection sensor" is the name of the part of the vehicle which is listed in the field database 103. The equivalent words for the selected vehicle part are "Airbag", "Airbag Sensor", "Air bag light" and "Pressure Sensor". Further, the relevant term identification module 221 extracts one or more failure comments from the joined data for the selected one of the one or more parts of the vehicle and identifies at least one problem area in the selected one of the one or more parts of the vehicle based on the one or more failure comments.

In an embodiment, the equivalent words are updated in the data dictionary database 109 for further processing by the vehicle inspection system 107. In an example, the relevant term identification module 221 may use at least one of text mining algorithms, tagging, semantic rules, Natural Language Processing (NLP), and correlation plots for identifying the relevant terms.

In an embodiment, the frequency determination module 223 is configured to identify the frequency of the relevant terms in the joined data 211 for the selected part of the vehicle. The frequency determination module 223 identifies number of times the relevant terms are listed in the joined data 211 for the selected part of the vehicle. As an example, the relevant terms for the selected vehicle part "occupant detection sensor" have appeared 4 times in the joined data 211. Therefore, the frequency of the relevant terms is 4. In an example, a text search engine may be used for vehicles that have same kind of problem. Further, a trend chart may be populated based on historical data and data obtained In an embodiment, the failure detection module 225 is configured to detect failure in the one or more parts of the vehicle. The failure detection module 225 detects the probability of failure in the one or more parts of the vehicle based on frequency of the relevant terms in the joined data 211. The failure detection module 225 detects the failure in the one or more parts of the vehicle if the frequency of the relevant terms for the one or more parts exceeds a predefined threshold frequency. The predefined threshold frequency is defined for each part of the vehicle. As an example, the predefined threshold frequency for the selected part of the vehicle "occupant detection sensor" is 2. The frequency identified for the relevant terms for the selected vehicle part "occupant detection sensor" is 4. The identified frequency exceeds the predefined threshold frequency. Therefore, the failure detection module 225 detects the failure in the "occupant detection sensor of the vehicle.

In an embodiment, upon identifying the probability of failure of the one or more parts of the vehicle, the vehicle inspection system 107 provides notification indicating defects in the one or more parts of the vehicle. Based on the defects indicated, one or more actions may be undertaken at the manufacturing unit and the service unit of the vehicle. The one or more actions includes, but not limited to, correcting the defects and replacing the part in the vehicle. In an example, the vehicle inspection system 107 may comprise an alert module (not shown in FIG. 1) to highlight an instant flow of information across various divisions of manufacturing unit to a user of the vehicle inspection system 107.

In an exemplary embodiment, the vehicle is a "car". The manufacturing unit of the car is at "Mumbai". As an example there are 10 cars manufactured in the month of November 2012. Each car is associated with a vehicle identification number. There may be one or more inspection engineers for monitoring the functioning of the cars. Upon monitoring the functioning, the inspection engineers may identify one or more defects or failure in one or more parts of one or more cars. The information of each car is stored in the inspection database 101. The below table 4 illustrates an exemplary inspection data 207 stored at the inspection database 101.

TABLE 4

INSPECTION DATA

| Vehicle Identification Number | Production Date | Warranty Period | Inspection Part | Inspection Failure Comments |
|---|---|---|---|---|
| 2130 | 01-11-2012 | 01-02-2013 | Torque data | Air bag light ON |
| 2163 | 01-11-2012 | 01-02-2013 | Torque data | Air bag light ON |
| 5349 | 02-11-2012 | 02-02-2013 | Torque data | Air bag light ON |
| 3248 | 10-11-2012 | 10-02-2013 | Torque data | Air bag light ON |
| 3567 | 15-11-2012 | 15-02-2013 | Torque data | Air bag light ON |
| 2356 | 01-11-2012 | 01-02-2013 | Torque data | Air bag light ON |
| 4325 | 05-11-2012 | 05-02-2013 | Torque data | Air bag light ON |
| 8970 | 08-11-2012 | 08-02-2013 | Torque data | Air bag light ON |

TABLE 4-continued

INSPECTION DATA

| Vehicle Identification Number | Production Date | Warranty Period | Inspection Part | Inspection Failure Comments |
|---|---|---|---|---|
| 4872 | 04-11-2012 | 04-02-2013 | Function Test | Problem in seat kit |
| 1067 | 07-11-2012 | 07-02-2013 | Function Test | Problem in seat kit |

As illustrated in the above table 4, the information of each car i.e the vehicle identification number, the manufacturing date, warranty period, names of one or more parts of the car which are identified as failed parts by the inspection engineer and the comments provided by the inspection engineer for the failure of the parts. For example, the car with the vehicle identification number 2130 is manufactured in the date of Jan. 11, 2012 and the warranty period of the car is three months from the date of manufacturing i.e Jan. 2, 2013. The inspection engineer has identified that there is a problem associated with air bag of the car. The inspection engineer indicates failure in the air bag. The part name is stored as "torque data" in the inspection database 101 for the air bag failure in the car. The inspection engineer also provides a failure comment indicating that there is light ON in the air bag.

After manufacturing, the cars may enter the market and the users may identify problems with the functioning of the car. The users may provide the cars for service with the service unit of the vehicle. The service unit may be located at Bangalore. The service unit maintains field database 103 to store information of each car which has reached for the service. The service person may enter the information of each car in the field database 103. An exemplary field data 209 stored at the field database 103 is shown in the below table 5.

TABLE 5

FIELD DATA

| Vehicle Identification Number | Production Date | Warranty Period | Vehicle Part | Field Failure Comments | Field Part |
|---|---|---|---|---|---|
| 2130 | 01-11-2012 | 01-02-2013 | Occupant detection sensor | User states that Air bag light ON | Airbag |
| 2163 | 01-11-2012 | 01-02-2013 | Occupant detection sensor | User states that Air bag light ON | Pressure Sensor |
| 5349 | 02-11-2012 | 02-02-2013 | Occupant detection sensor | User states that Air bag light ON | Airbag Sensor |
| 3248 | 10-11-2012 | 10-02-2013 | Occupant detection sensor | User states that Air bag light ON | Air bag light |
| 3567 | 15-11-2012 | 15-02-2013 | Occupant detection sensor | User states that Air bag light ON | Air bag light |
| 2356 | 01-11-2012 | 01-02-2013 | Occupant detection sensor | User states that Air bag light ON | Air bag light |
| 4325 | 05-11-2012 | 05-02-2013 | Occupant detection sensor | User states that Air bag light ON | Air bag light |
| 8970 | 08-11-2012 | 08-02-2013 | Occupant detection sensor | User states that Air bag light ON | Airbag |
| 4872 | 04-11-2012 | 04-02-2013 | Seat Kit | User states | Seat |

TABLE 5-continued

| FIELD DATA | | | | | |
|---|---|---|---|---|---|
| Vehicle Identi-fication Number | Production Date | Warranty Period | Vehicle Part | Field Failure Comments | Field Part |
| 1067 | 07-11-2012 | 07-02-2013 | Seat Kit | problem in seta kit User states problem in seta kit | back Seat Belt |

As illustrated in the above table 5, the information of each car i.e the vehicle identification number, the manufacturing date, warranty period, names of one or more parts of the car which are identified as failed parts by the user and the comments provided by the user for the failure of the parts. The service of the vehicle is performed if the vehicle is within the warranty period. In an embodiment, the service unit of the vehicle may provide warranty for one or more parts of the vehicle. The information of the warranty period provided for the one or more parts of the vehicle is also stored in the field database 103.

As an example, the car with the vehicle identification number 2130 is manufactured in the date of Jan. 11, 2012 and the warranty period of the car is three months from the date of manufacturing i.e Jan. 2, 2013. The user of the car with the vehicle identification number 2130 has encountered a problem in the air bag. The part name is indicated as “airbag” in the field database 103. The failure comment provided by the user is also stored in the field database 103. The failure comment stored is “user states that the air bag light is ON”. The field database 103 also stores the part name of the vehicle under which the filed name occurs. As an example, the vehicle part name indicated by the service personnel for the air bag is “occupant detection sensor”.

The Association module 219 of the vehicle inspection system 107 associates the inspection data 207 and the field data 209 to form the joined data 211. The joined data 211 includes information of each car. An exemplary joined data 211 is as shown in the below table 6.

TABLE 6

| JOINED DATA | | | | | | | |
|---|---|---|---|---|---|---|---|
| Vehicle Identification Number | Production Date | Warranty Period | Inspection Part | Vehicle Part | Inspection Comments | Field Comments | Field Part |
| 2130 | 1 Nov. 2012 | 1 Feb. 2013 | Torque Data | Occupant Detection Sensor | Air bag light ON | User states that Air bag light ON | Airbag |
| 2163 | 1 Nov. 2012 | 1 Feb. 2013 | Torque Data | Occupant Detection Sensor | Air bag light ON | User states that Air bag light ON | Pressure Sensor |
| 5349 | 2 Nov. 2012 | 2 Feb. 2013 | Torque Data | Occupant Detection Sensor | Air bag light ON | User states that Air bag light ON | Airbag Sensor |
| 3248 | 10 Nov. 2012 | 10 Feb. 2013 | Torque Data | Occupant Detection Sensor | Air bag light ON | User states that Air bag light ON | Air bag light |
| 3567 | 15 Nov. 2012 | 15 Feb. 2013 | Torque Data | Occupant Detection Sensor | Air bag light ON | User states that Air bag light ON | Air bag light |
| 2356 | 1 Nov. 2012 | 1 Feb. 2013 | Torque Data | Occupant Detection Sensor | Air bag light ON | User states that Air bag light ON | Air bag light |
| 4325 | 5 Nov. 2012 | 5 Feb. 2013 | Torque Data | Occupant Detection Sensor | Air bag light ON | User states that Air bag light ON | Air bag light |
| 8970 | 8 Nov. 2012 | 8 Feb. 2013 | Torque Data | Occupant Detection Sensor | Air bag light ON | User states that Air bag light ON | Airbag |
| 4872 | 4 Nov. 2012 | 4 Feb. 2013 | Function Test | Seat kit | Seat kit problem | User states that Air bag light ON | Seat back |
| 1067 | 7 Nov. 2012 | 7 Feb. 2013 | Function Test | Seat Kit | Seat Kit problem | User states problem in seat kit | Seat Belt |

As illustrated in the above table, the joined data 211 includes all the information of the car from the inspection database 101 and the field database 103 based on the vehicle identification number of the car. As an example, the user may select the part of the vehicle named “occupant detection sensor". The relevant term identification module 221 identifies the relevant terms for the selected part of the vehicle. The relevant terms for the selected vehicle part "occupant detection sensor" are "airbag", "airbag light", "occupant sensor", "pressure sensor" and "airbag sensor".

The data dictionary database 109 includes a data dictionary table for storing the relevant terms for each part of the vehicle. An exemplary data dictionary table (table 7) stored at the data dictionary database 109 is as shown below.

TABLE 7

| Data dictionary Table | | |
|---|---|---|
| Inspection part list | Vehicle part list | Relevant terms |
| Torque data | Occupant detection sensor | Air bag, air bag sensor, air bag light, pressure sensor |
| Function data | Seat kit | Seat belt, seat back |

The frequency determination module 223 determines the frequency of the relevant terms in the joined data 211. The frequency of the relevant terms in the joined data 211 for the selected part "occupant detection sensor" is 8. The below table 8 illustrates the frequency of the relevant terms for the selected part "occupant detection sensor"

TABLE 8

| Data dictionary Table | | | |
|---|---|---|---|
| Inspection part list | Inspection part Frequency | Field part List | Field part frequency |
| Torque Data | 8 | Air bag | 2 |
| | | Air bag light | 4 |
| | | Pressure sensor | 1 |
| | | Air bag sensor | 1 |
| Function data | 2 | Seat back | 1 |
| | | Seat belt | 1 |

The failure detection module 225 detects the probability of failure of the vehicle part if the identified frequency exceeds predefined threshold frequency. The predefined threshold frequency for the selected part is 5. The identified frequency for the selected part is 8. Since, the identified frequency exceeds the threshold frequency the failure detection module 225 detects the failure in the selected vehicle part "occupant detection sensor".

Figure 4:
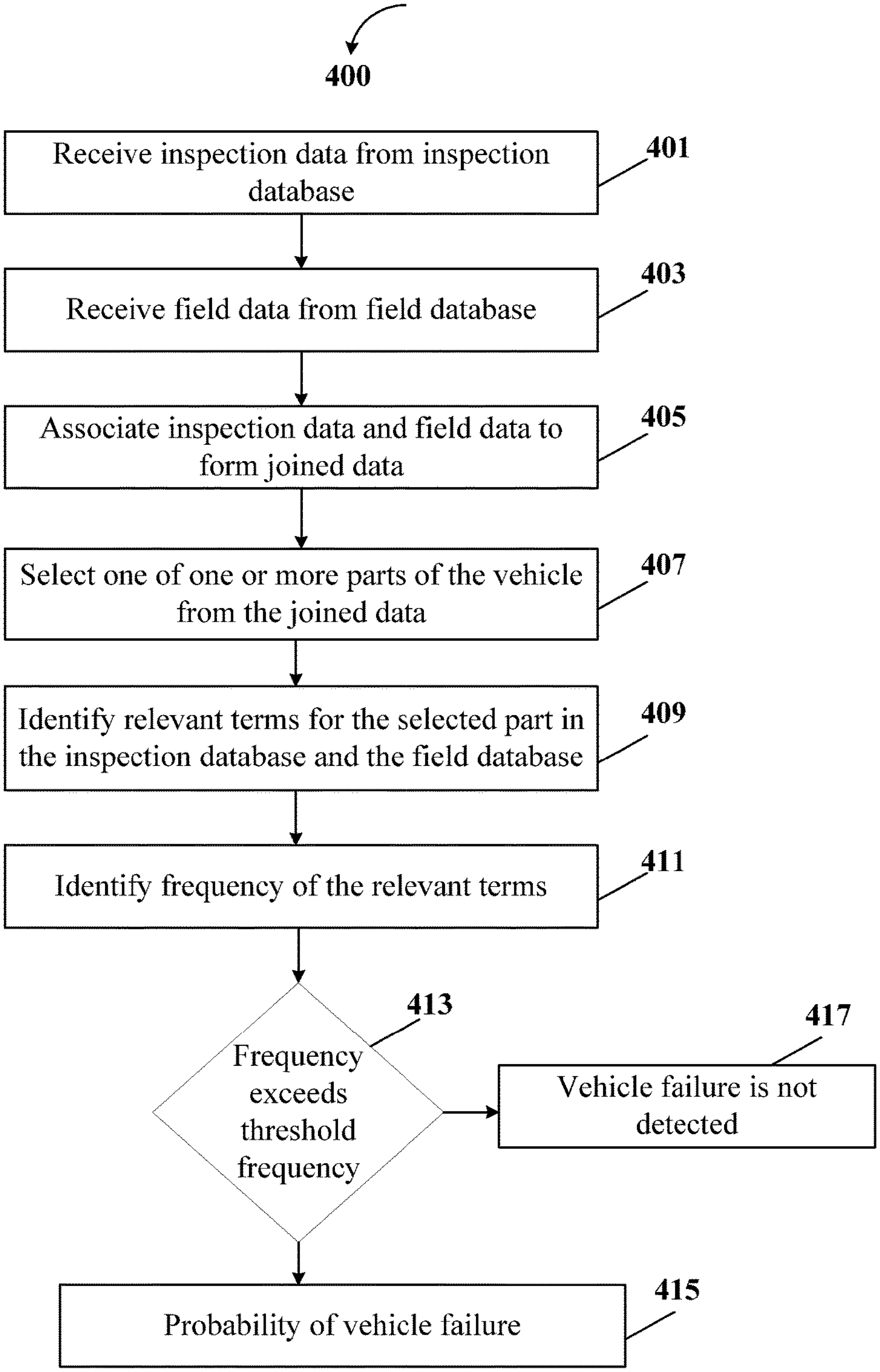
FIG. 4 illustrates a flowchart showing method for performing vehicle inspection in accordance with some embodiments of the present disclosure.

FIG. 4 illustrates a flowchart showing method for performing vehicle inspection in accordance with some embodiments of the present disclosure.

As illustrated in FIG. 4, the method 400 comprises one or more blocks for performing vehicle inspection using a vehicle inspection system 107. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, inspection data 207 of one or more parts of the vehicle is received. In an embodiment, the receiving module 217 of the vehicle inspection system 107 receives inspection data 207 from inspection database 101 stored at manufacturing unit of the vehicle. The inspection database 101 stores information of one or more parts of the vehicle inspected by the inspection engineer.

At block 403, field data 209 of the one or more parts of the vehicle is received. In an embodiment, the receiving module 217 of the vehicle inspection system 107 receives field data 209 from field database 103 stored at service unit of the vehicle. The field database 103 stores information of the one or more parts of the vehicle which are identified as failure parts by a user of the vehicle.

At block 405, the inspection data 207 and the field data 209 are associated. In an embodiment, the association module 219 of the vehicle inspection system 107 associates the inspection data 207 and the field data 209 to form a joined data 211. The association is performed based on vehicle identification number. The joined data 211 includes information of the vehicle identification number, names of one or more parts of the vehicle which are inspected at the manufacturing unit of the vehicle, the failure comments for the one or more parts of the vehicle, manufacturing date of the vehicle, warranty period of the vehicle, names of one or more parts of the vehicle which are identified as failure parts by a user of the vehicle and the one or more failure comments associated with the one or more parts of the vehicle.

At block 407, the part of the vehicle is selected. In an embodiment, the user may select one of one or more parts of the vehicle from the joined data 211.

At block 409, the relevant terms for the selected part of the vehicle are identified. In an embodiment, the relevant term identification module 221 identifies the relevant terms for the selected part of the vehicle. The relevant terms are identified for the selected part of the vehicle from the inspection database 101 and the field database 103.

At block 411, the frequency of the relevant terms is identified. In an embodiment, the frequency determination module 223 determines the frequency of the relevant terms in the joined data 211. The frequency determination module 223 determines the number of times the selected part of the vehicle is appeared in the list.

At block 413, the vehicle inspection system 107 determines whether the frequency of the relevant terms exceeds the predefined threshold frequency. If the frequency exceeds the predefined threshold frequency then the method proceeds to block 415 via "yes". If the frequency does not exceed the predefined threshold frequency then the method proceeds to block 417 via "No".

At block 415, the probability of the vehicle failure is detected. The failure detection module 225 detects the failure of the vehicle upon identifying the frequency exceeding the predefined threshold frequency. Upon detecting the probability of failure of the vehicle, the notification is provided to correct the defects in the vehicle.

At block 417, the failure in the vehicle is not detected. The failure detection module 225 identifies that there is no failure in the vehicle upon detecting the frequency less than the predefined threshold frequency.

In an embodiment, upon identifying the probability of failure of the one or more parts of the vehicle, the vehicle inspection system 107 provides a notification indicating defects in the one or more parts of the vehicle. Based on the defects indicated, one or more actions may be undertaken at the manufacturing unit and the service unit of the vehicle.

The one or more actions includes, but not limited to, correcting the defects and replacing the part in the vehicle.

Figure 5:
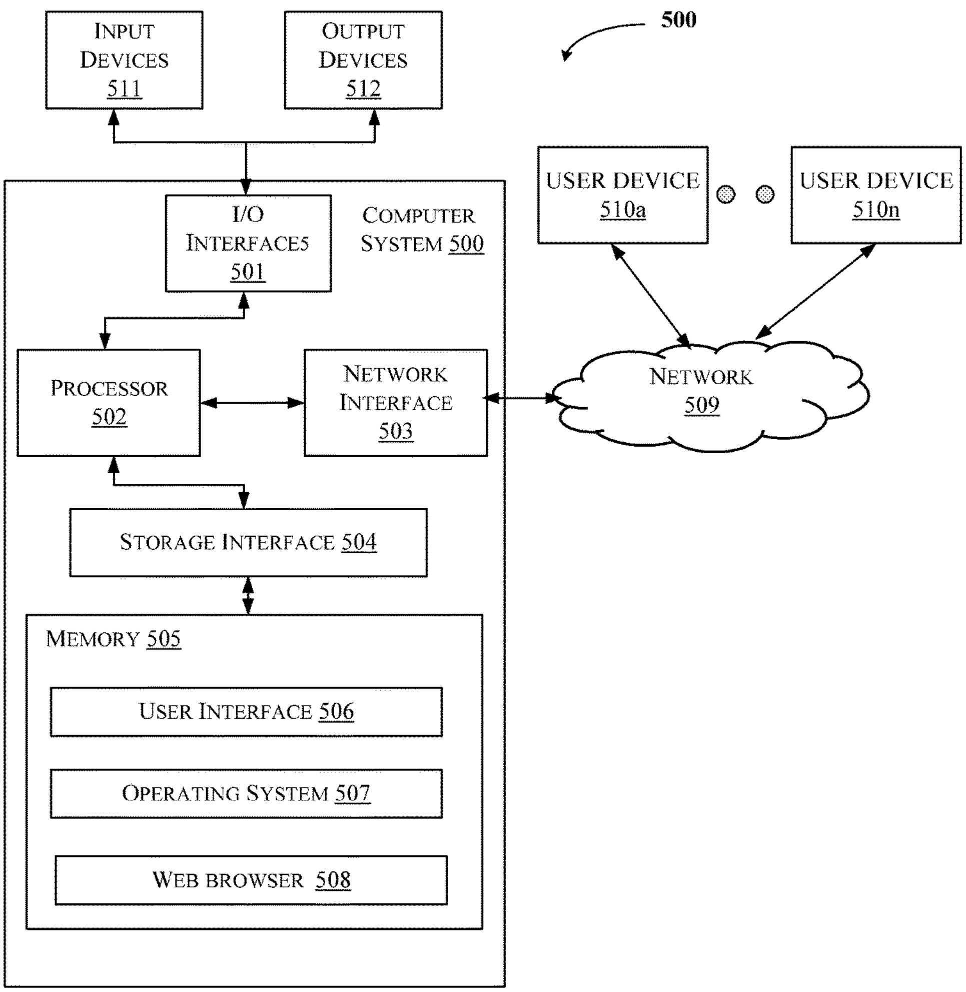
FIG. 5. illustrates a block diagram of an exemplary computer system for implementing embodiments consistent with the present disclosure.

FIG. 5 illustrates a block diagram of an exemplary computer system 500 for implementing embodiments consistent with the present invention. In an embodiment, the computer system 500 is used to perform vehicle inspection to identify probability of vehicle failure. The computer system 500 may comprise a central processing unit ("CPU" or "processor") 502. The processor 502 may comprise at least one data processor for executing program components for executing user- or system-generated business processes. A user may include a person, a person using a device such as such as those included in this invention, or such a device itself. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 501, the computer system 500 may communicate with one or more I/O devices (511 and 512).

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with one or more user devices 510 (a, . . . , n). The communication network 509 can be implemented as one of the different types of networks, such as intranet or Local Area Network (LAN) and such within the organization. The communication network 509 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc. The one or more user devices 510 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface application 506, an operating system 507, web server 508 etc. In some embodiments, computer system 500 may store user/application data 506, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 506 may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 500 may implement a web browser 508 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

In an embodiment, the present disclosure receives field failure data from a filed database and associates with inspection data to identify probability of vehicle failure.

In an embodiment, the present disclosure provides suggestions correct the failure in the vehicle in real-time.

In an embodiment, the present disclosure reduces operator's effort of manually analyzing the inspection data and the field data for identifying the vehicle failure.

In an embodiment, the present disclosure reduces time required to identify vehicle failure.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for optimizing vehicle failure detection using data from various locations in a vehicle failure detection network, the method comprising:

receiving, by a vehicle inspection computing device, inspection data of one or more parts of a vehicle from an inspection database associated with the vehicle failure detection network;

receiving, by the vehicle inspection computing device, field data of the one or more parts of the vehicle from a field failure database associated with the vehicle failure detection network;

associating, by the vehicle inspection computing device, the inspection data and the field data, based on an identification number of the vehicle, to obtain a joined data using an association algorithm;

identifying, by the vehicle inspection computing device, a set of relevant equivalent terms from the inspection data and the field data for a selected one of the one or more parts of the vehicle from one or more failure comments in the joined data using at least one of text mining algorithms, tagging, semantic rules, Natural Language Processing (NLP), or correlation plots;

determining, by the vehicle inspection computing device, a frequency of the set of relevant equivalent terms for the selected one of the one or more parts of the vehicle in the joined data;

detecting, by the vehicle inspection computing device, an existence of failure of the vehicle when the determined frequency of the set of relevant equivalent terms for the selected one of the one or more parts of the vehicle exceeds a predefined threshold frequency;

providing, by the vehicle inspection computing device, a notification indicating defects in the selected one of the one or more parts of the vehicle based on the existence of failure of the vehicle; and providing, by the vehicle inspection computing device, a recommendation indicating one or more corrective actions with respect to the defects in the selected one of the one or more parts of the vehicle, wherein the one or more corrective actions comprise correcting the defects or replacing the selected one of the one or more parts of the vehicle.

2. The method as claimed in claim 1, wherein the inspection data is obtained from a manufacturing unit of the vehicle associated with the vehicle failure detection network.

3. The method as claimed in claim 1, wherein the field data is obtained from at least one service unit of the vehicle associated with the vehicle failure detection network.

4. The method as claimed in claim 1, wherein identifying the set of relevant equivalent terms further comprises:

extracting, by the vehicle inspection computing device, one or more failure comments from the joined data for the selected one of the one or more parts of the vehicle; and identifying, by the vehicle inspection computing device, at least one problem area in the selected one of the one or more parts of the vehicle based on the one or more failure comments.

5. The method as claimed in claim 1, wherein the set of relevant equivalent terms are obtained from a data dictionary comprising commonly used terms for the one or more parts of the vehicle.

6. The method as claimed in claim 5, wherein the data dictionary is updated with the identified set of relevant equivalent terms for the selected one of the one or more parts of the vehicle.

7. A vehicle inspection computing device comprising a processor and a memory coupled to the processor which is configured to be capable of executing programmed instructions comprising and stored in the memory to:

receive inspection data of one or more parts of a vehicle from an inspection database associated with a vehicle failure detection network;

receive field data of the one or more parts of the vehicle from a field failure database associated with the vehicle failure detection network;

associate the inspection data and the field data, based on an identification number of the vehicle, to obtain a joined data using an association algorithm;

identify a set of relevant equivalent terms from the inspection data and the field data for a selected one of the one or more parts of the vehicle from one or more failure comments in the joined data using at least one of text mining algorithms, tagging, semantic rules, Natural Language Processing (NLP), or correlation plots;

determine a frequency of the set of relevant equivalent terms for the selected one of the one or more parts of the vehicle in the joined data; and detect an existence of failure of the vehicle when the determined frequency of the set of relevant equivalent terms for the selected one of the one or more parts of the vehicle exceeds a predefined threshold frequency;

provide a notification indicating defects in the selected one of the one or more parts of the vehicle based on the existence of failure of the vehicle; and provide a recommendation indicating one or more corrective actions with respect to the defects in the selected one of the one or more parts of the vehicle, wherein the one or more corrective actions comprise correcting the defects or replacing the selected one of the one or more parts of the vehicle.

8. The device as claimed in claim 7, wherein the inspection data is obtained from a manufacturing unit of the vehicle associated with the vehicle failure detection network.

9. The device as claimed in claim 7, wherein the field data is obtained from at least one service unit of the vehicle associated with the vehicle failure detection network.

10. The device as claimed in claim 7, wherein the processor coupled to the memory is further configured to be capable of executing additional programmed instructions comprising and stored in the memory to:

extract one or more failure comments from the joined data for the selected one of the one or more parts of the vehicle; and identify at least one problem area in the selected one of the one or more parts of the vehicle based on the one or more failure comments.

11. The device as claimed in claim 7, wherein the processor coupled to the memory is further configured to be capable of executing at least one additional programmed instruction comprising and stored in the memory to:

obtain the set of relevant equivalent terms from a data dictionary comprising commonly used terms for the one or more parts of the vehicle.

12. The device as claimed in claim 11, wherein the processor coupled to the memory is further configured to be capable of executing at least one additional programmed instruction comprising and stored in the memory to:

update the data dictionary with the identified set of relevant equivalent terms for the selected one of the one or more parts of the vehicle.

13. A non-transitory computer readable medium having stored thereon instructions for performing vehicle inspection comprising executable code which when executed by a process causes the processor to perform steps comprising:

receiving inspection data of one or more parts of a vehicle from an inspection database associated with a vehicle failure detection network;

receiving field data of the one or more parts of the vehicle from a field failure database associated with the vehicle failure detection network;

associating the inspection data and the field data, based on an identification number of the vehicle, to obtain a joined data using an association algorithm;

identifying a set of relevant equivalent terms from the inspection data and the field data for a selected one of the one or more parts of the vehicle from one or more failure comments in the joined data using at least one of text mining algorithms, tagging, semantic rules, Natural Language Processing (NLP), or correlation plots;

determining a frequency of the set of relevant equivalent terms for the selected one of the one or more parts of the vehicle in the joined data;

detecting an existence of failure of the vehicle when the determined frequency of the set of relevant equivalent terms for the selected one of the one or more parts of the vehicle exceeds a predefined threshold frequency; and providing a notification indicating defects in the selected one of the one or more parts of the vehicle based on the existence of failure of the vehicle; and providing a recommendation indicating one or more corrective actions with respect to the defects in the selected one of the one or more parts of the vehicle, wherein the one or more corrective actions comprise correcting the defects or replacing the selected one of the one or more parts of the vehicle.

14. The medium as claimed in claim 13, wherein the inspection data is obtained from a manufacturing unit of the vehicle associated with the vehicle failure detection network.

15. The medium as claimed in claim 13, wherein the field data is obtained from at least one service unit of the vehicle associated with the vehicle failure detection network.

16. The medium as claimed in claim 13, further having stored thereon additional instructions that when executed by the processor cause the processor to perform additional steps comprising:

extracting one or more failure comments from the joined data for the selected one of the one or more parts of the vehicle; and identifying at least one problem area in the selected one of the one or more parts of the vehicle based on the one or more failure comments.

17. The medium as claimed in claim 13, further having stored thereon at least one additional instruction that when executed by the processor causes the processor to perform at least one additional step comprising:

obtaining the set of relevant equivalent terms from a data dictionary comprising commonly used terms for the one or more parts of the vehicle.

18. The medium as claimed in claim 17, further having stored thereon at least one additional instruction that when executed by the processor causes the processor to perform at least one additional step comprising:

updating the data dictionary with the identified set of relevant equivalent terms for the selected one of the one or more parts of the vehicle.

* * * * *